(No Model.)
W. H. CRITCHFIELD & E. J. EMMONS.
COMBINED TROUGH AND RACK.
No. 402,145. Patented Apr. 30, 1889.
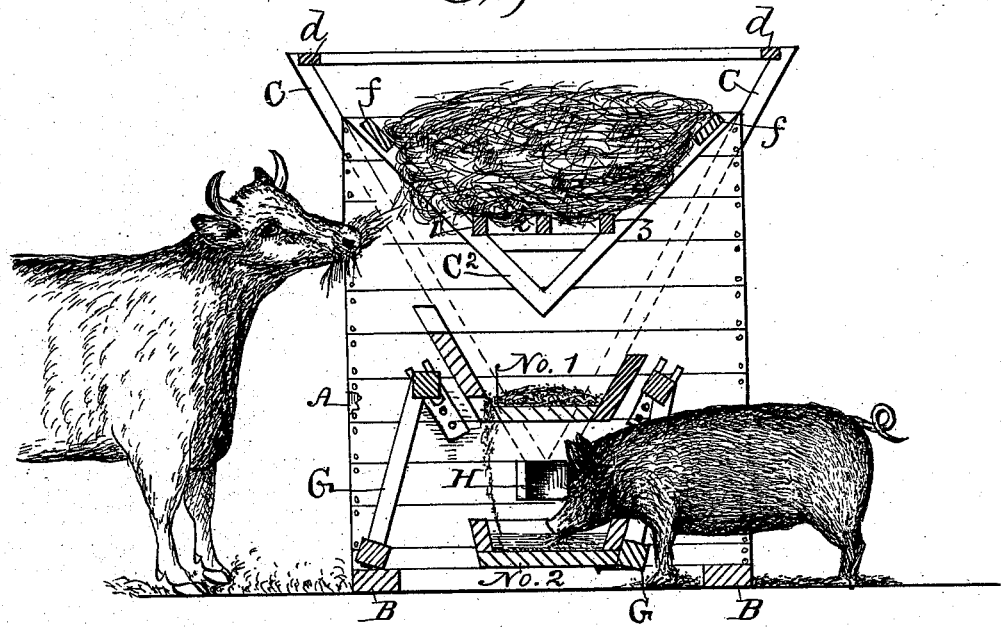
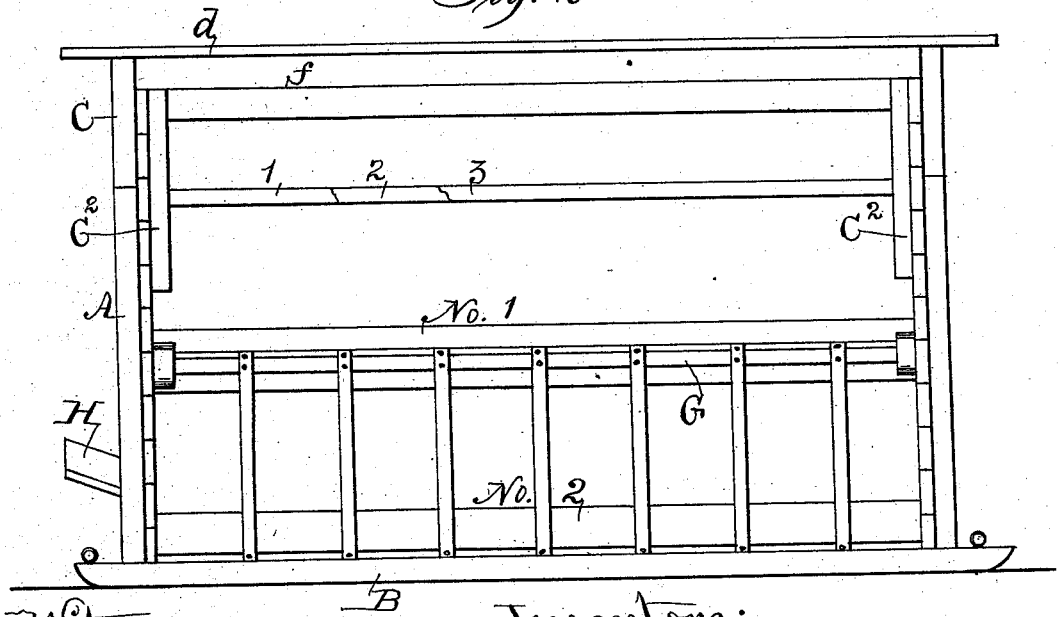
Witnesses:
Q. H. Orwig.
M. P. Smith.
Inventors:
William H. Critchfield,
Enos J. Emmons,
By Thomas G. Orwig, Attorney.
N. PETERS, Photo-Lithographer, Washington, D. C.

UNITED STATES PATENT OFFICE.

WILLIAM H. CRITCHFIELD AND ENOS JOSEPH EMMONS, OF WIRT, IOWA.

COMBINED TROUGH AND RACK.

SPECIFICATION forming part of Letters Patent No. 402,145, dated April 30, 1889.

Application filed July 20, 1888. Serial No. 280,556. (No model.)

*To all whom it may concern:*

Be it known that we, WILLIAM H. CRITCHFIELD and ENOS JOSEPH EMMONS, citizens of the United States of America, and residents of Wirt, in the county of Ringgold and State of Iowa, have invented a Feed-Trough and Rack, of which the following is a specification.

Our object is to save labor and prevent waste in feeding horses, cattle, hogs, and sheep; and our invention consists in the construction and combination of two troughs, two adjustable trough-guards, and a rack with a portable frame, as hereinafter set forth, in such a manner that feed usually wasted by cattle will be gathered and preserved in an elevated trough, from whence it can be readily emptied into a lower trough to be fed to hogs whenever desired.

Figure 1 of the accompanying drawings is a transverse vertical sectional view showing the relative positions of the two troughs, two guards, and the rack. Fig. 2 is a side view of the complete device ready for practical use, and to be moved about by means of the sills at its base, that serve as sled-runners.

A A are the upright corner-pieces of a quadrangular frame fixed upon the sills or parallel runners B by means of mortises and tenons or in any suitable way. Boards are nailed to the inside faces of the uprights A to close the ends of the complete device and to brace and strengthen the frame.

C are triangular-shaped frames fixed to the outside and top portions of the ends of the complete frame, and $C^2$ are triangular-shaped frames of smaller size fixed to the inside and top portion of the same ends to produce a rack adapted to retain hay, corn-fodder, &c., in an elevated position.

$d$ $d$ are horizontal bars fixed to the top corners of the frame C, and $f$ $f$ are bars fixed to the top corners of the smaller frames, $C^2$.

1 2 3 are bars in parallel position and in the same horizontal plane, fixed to the frames $C^2$, to serve as a bottom in the rack thus produced by the triangular fixed frames and the bars fixed thereto in horizontal positions.

No. 1 is a trough fixed to the ends of the frame to extend horizontally under the center of the rack in such a manner that the feed that drops through the rack will fall into the trough. One of the sides of the trough is fitted in bearings formed in or fixed to the ends of the frame in such a manner that it can be raised to allow the contents of the trough to be scraped out, so as to fall into a trough, No. 2, underneath, that is fixed on top of the cross-pieces that connect the base-pieces or runners B.

G G are guards in the form of frames hinged to the ends of the complete device in such a manner that they can be fastened in position close to the trough No. 2, as required, to allow hogs to gain access to the trough, and also, as required, to keep them separated and to prevent them from crowding and fighting and getting their feet into the trough, and also hinged in such a manner that they can be inclined outward and fastened to the runners B by means of hooks and staples or in any suitable way, so as to prevent the hogs from getting access to the trough to feed therefrom.

H is a spout fixed in one of the ends of the frame in such a manner that slops or food of various kinds can be poured in and thereby conducted into the trough No. 2.

A device adapted for thus feeding large and small animals simultaneously and advantageously can be readily constructed by a farmer of ordinary mechanical skill and varied in size to suit the number of animals to be fed therefrom.

We are aware that a feed-rack and a trough have been combined in such a manner that grain and particles of feed would drop from the rack into the trough. We are also aware that guards have been adjustably connected with a trough, so they could be put in position to prevent animals from getting to the trough whenever desired; but our manner of constructing and combining a rack, two guards, and two parallel troughs located at different points of elevation, so that the contents of the upper trough can readily be emptied into the lower trough, is novel and advantageous.

We claim as our invention—

The device for feeding animals, consisting of the frame A B, the triangular frames C and C², having fixed horizontal bars to produce a feed-rack, the trough No. 1, having an adjustable side or section, the trough No. 2, and the adjustable guards G, constructed and combined substantially as shown and described, for the purposes stated.

WILLIAM H. CRITCHFIELD.
ENOS JOSEPH EMMONS.

Witnesses:
A. W. DENNIS,
S. POLLOCK.